(12) United States Patent
Strickland

(10) Patent No.: US 11,771,079 B1
(45) Date of Patent: Oct. 3, 2023

(54) QUICKSTAND HUNTING PLATFORM

(71) Applicant: Michael Shane Strickland, Scottsboro, AL (US)

(72) Inventor: Michael Shane Strickland, Scottsboro, AL (US)

( * ) Notice: Subject to any disclaimer, the term of this patent is extended or adjusted under 35 U.S.C. 154(b) by 700 days.

(21) Appl. No.: 16/723,112

(22) Filed: Dec. 20, 2019

Related U.S. Application Data

(60) Provisional application No. 62/782,747, filed on Dec. 20, 2018.

(51) Int. Cl.
*A01M 31/02* (2006.01)

(52) U.S. Cl.
CPC .................................. *A01M 31/02* (2013.01)

(58) Field of Classification Search
CPC .................................................... A01M 31/02
See application file for complete search history.

(56) References Cited

U.S. PATENT DOCUMENTS

| | | | |
|---|---|---|---|
| 4,022,292 A | 5/1977 | Van Gompel |
| 4,597,473 A | 7/1986 | Peck |
| 4,667,773 A | 5/1987 | Davis |
| 4,727,961 A | 3/1988 | Dawson |
| 5,363,941 A | 11/1994 | Richard |
| 5,368,127 A | 11/1994 | Phillips |
| 5,379,861 A | 1/1995 | Amacker |
| 5,492,198 A | 2/1996 | Williams |
| 5,641,036 A | 6/1997 | Maxwell |
| 5,996,738 A | 12/1999 | Nelsen |
| 6,523,642 B1 | 2/2003 | Graham, Jr. et al. |
| 6,568,505 B1 | 5/2003 | D'Acquisto |
| 7,246,683 B2 | 7/2007 | Pringnitz |
| 7,584,940 B2 | 9/2009 | Gee |
| 7,717,232 B2 | 5/2010 | Butcher |
| 7,849,964 B2 | 12/2010 | Amacker et al. |
| 8,132,648 B2 | 3/2012 | Tong |
| 8,292,033 B2 | 10/2012 | Hale |
| 9,027,709 B2 | 5/2015 | Wheelington |

*Primary Examiner* — Jessica B Wong
(74) *Attorney, Agent, or Firm* — Angela Holt; Bradley Arant Boult Cummings LLP

(57) ABSTRACT

Embodiments of a tree stand for mounting to a tree trunk are disclosed. The tree stand includes a platform and a pair of oppositely disposed arms. The pair of oppositely disposed arms are configured to grip the tree trunk in a closed position and are separable to release the tree trunk in an open position. The platform is connected to the pair of oppositely arms so that the platform is mountable to the tree trunk when the pair of oppositely disposed arms grip the tree trunk in the closed position. The arms thus make it much easier to mount the tree stand and increase the stability and safety of the tree stand.

5 Claims, 13 Drawing Sheets

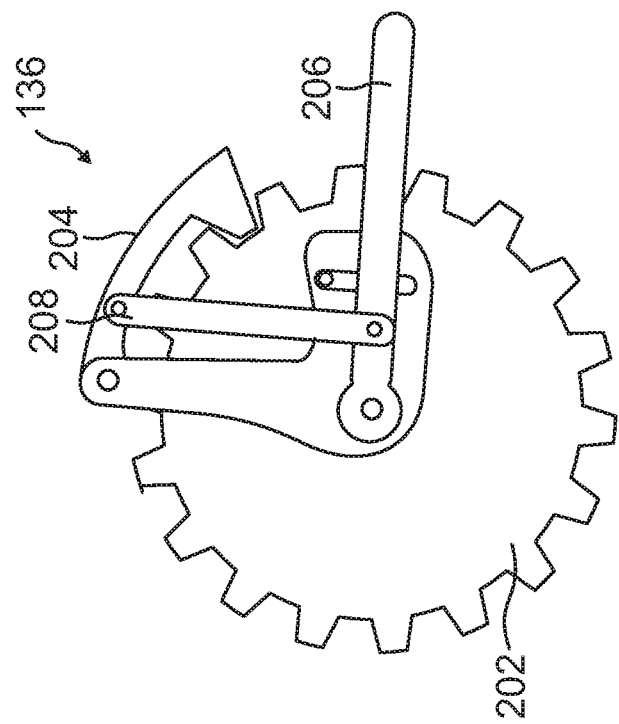
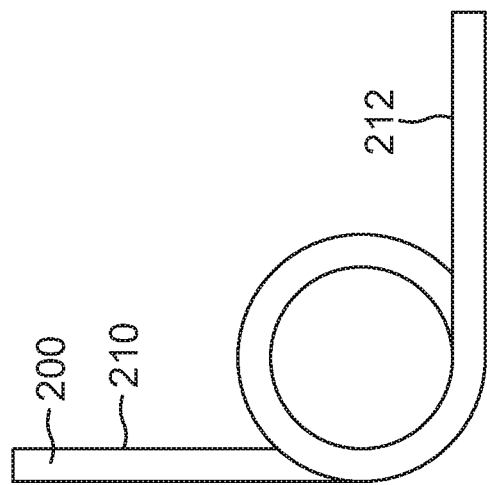
FIG. 4

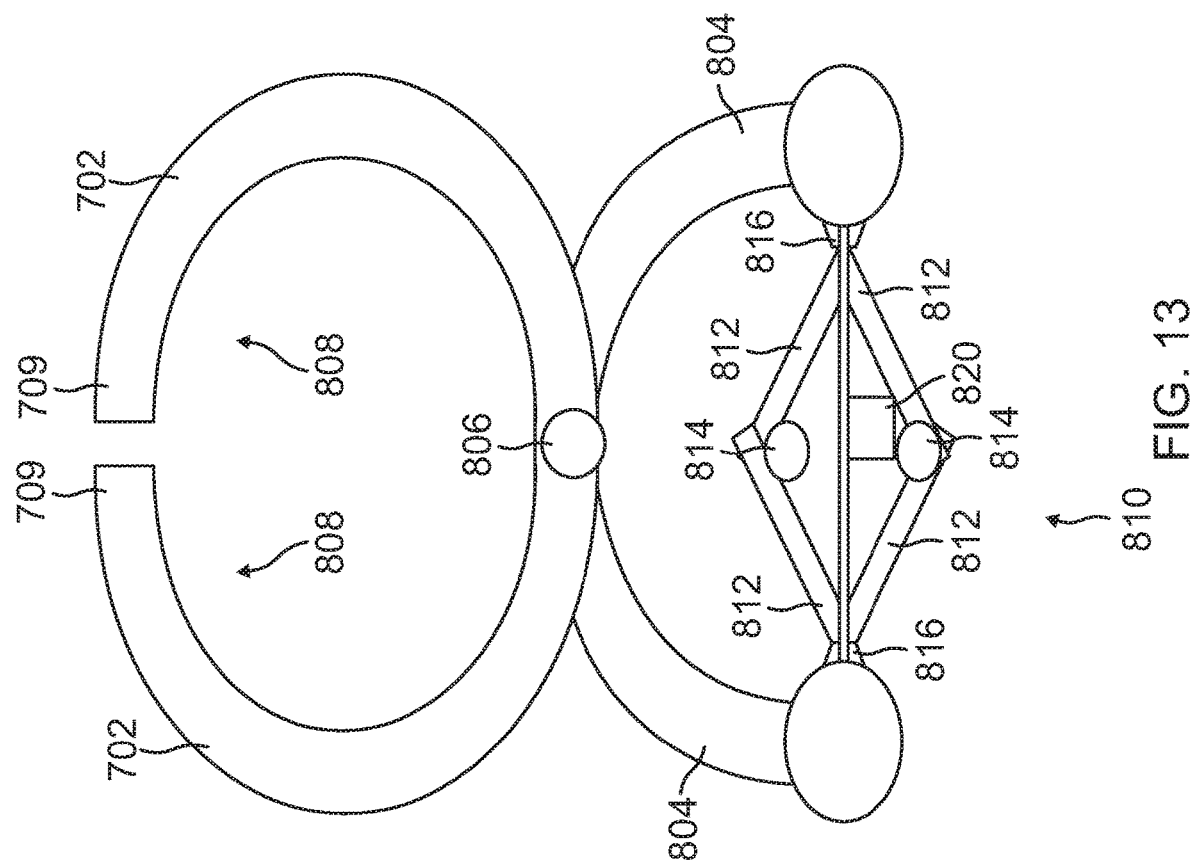

QUICKSTAND HUNTING PLATFORM

RELATED APPLICATIONS

This application claims the benefit of provisional patent application Ser. No. 62/782,747, filed Dec. 20, 2018, the disclosure of which is hereby incorporated herein by reference in its entirety.

FIELD OF THE DISCLOSURE

This disclosure relates generally to hunting platforms or other applications requiring an elevated platform such as outdoor photography.

BACKGROUND

Climbing tree stands are typically used by hunters in order to get an elevated view of an area being hunted. In general, there is one basic design with only slight variations. Climbing tree stands provide two platforms—an upper and lower—used to "climb up the tree." Generally, the tree stand is secured to the tree using some kind of cord or cable or chain or strap The majority of accidents with the climbing tree stands occur while ascending or descending the tree. Furthermore, mounting a ladder stand to a tree is, at best, difficult. To mount the ladder stand, a hunter must climb up an unsecured ladder stand to attach the ladder stand to the tree thus increasing the risks of accident and injury.

Thus, what are needed are safer and more stable designs for a tree stand.

SUMMARY

Embodiments of a tree stand for mounting to a tree trunk are disclosed. The tree stand includes a platform and a pair of oppositely disposed arms. The pair of oppositely disposed arms are configured to grip the tree trunk in a closed position and are separable to release the tree trunk in an open position. The platform is connected to the pair of oppositely arms so that the platform is mountable to the tree trunk when the pair of oppositely disposed arms grip the tree trunk in the closed position. The arms thus make it much easier to mount the tree stand and increase the stability of the tree stand.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawings incorporated in and forming a part of this specification illustrate several aspects of the disclosure, and together with the description serve to explain the principles of the disclosure.

FIG. 4 illustrates one embodiment of a ratchet gear and pawl mechanism and torsion spring, which may be utilized in the tree stand mounting mechanism shown in FIG. 1.

FIG. 11 illustrates a back view of the tree stand mounting mechanism shown in FIG. 8, wherein FIG. 11 illustrates shown the pole engagement unit of the tree stand mounting mechanism.

FIG. 13 illustrates still another embodiment of a tree stand mounting mechanism that utilizes a beveled gear system to function a bolt with opposing threads to mount and unmount utilizing the extendable pole.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Figure 1:
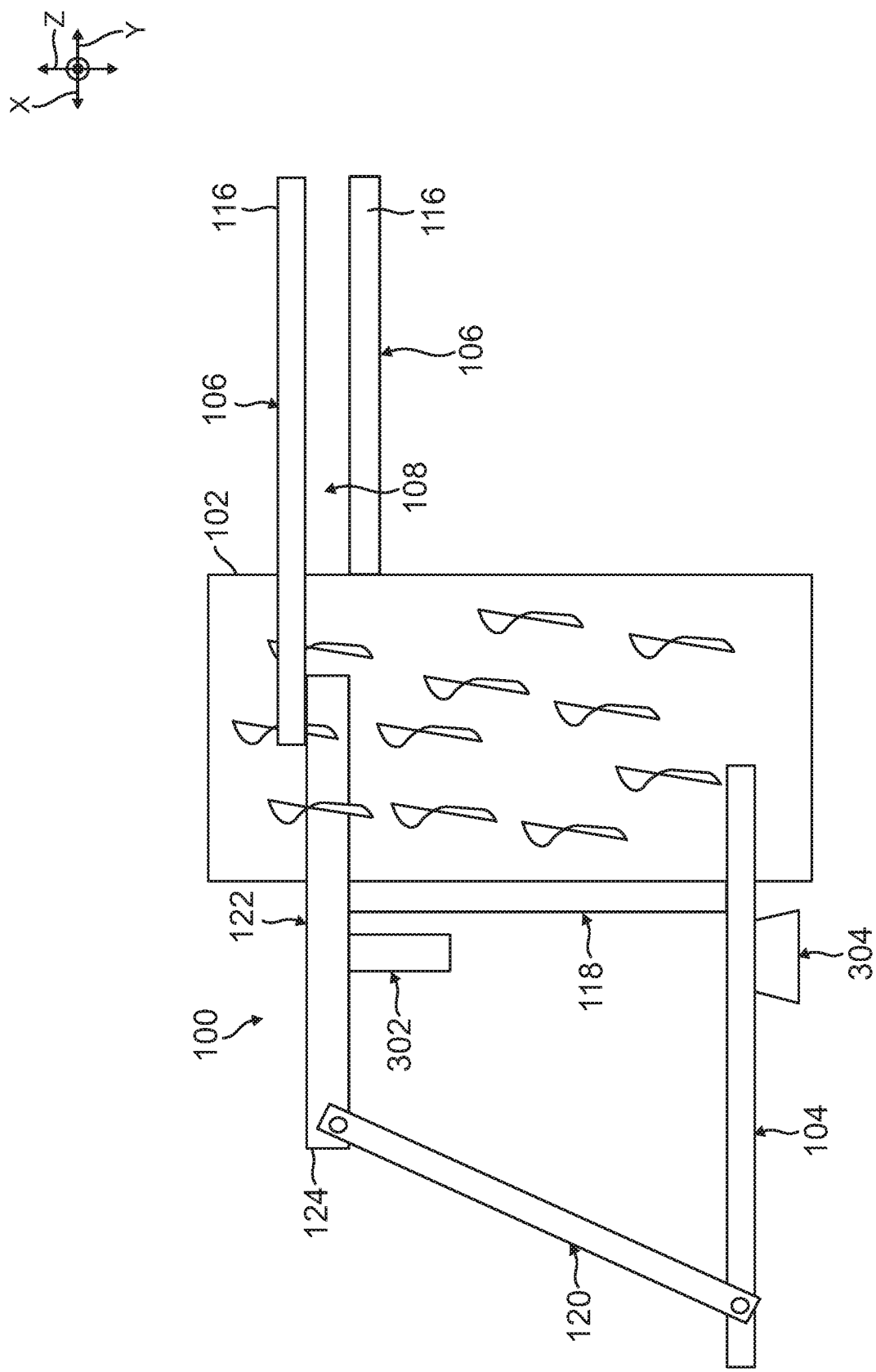
FIG. 1 illustrates a side view of one embodiment of a tree stand mounted on a tree trunk of a tree.
Figure 2:
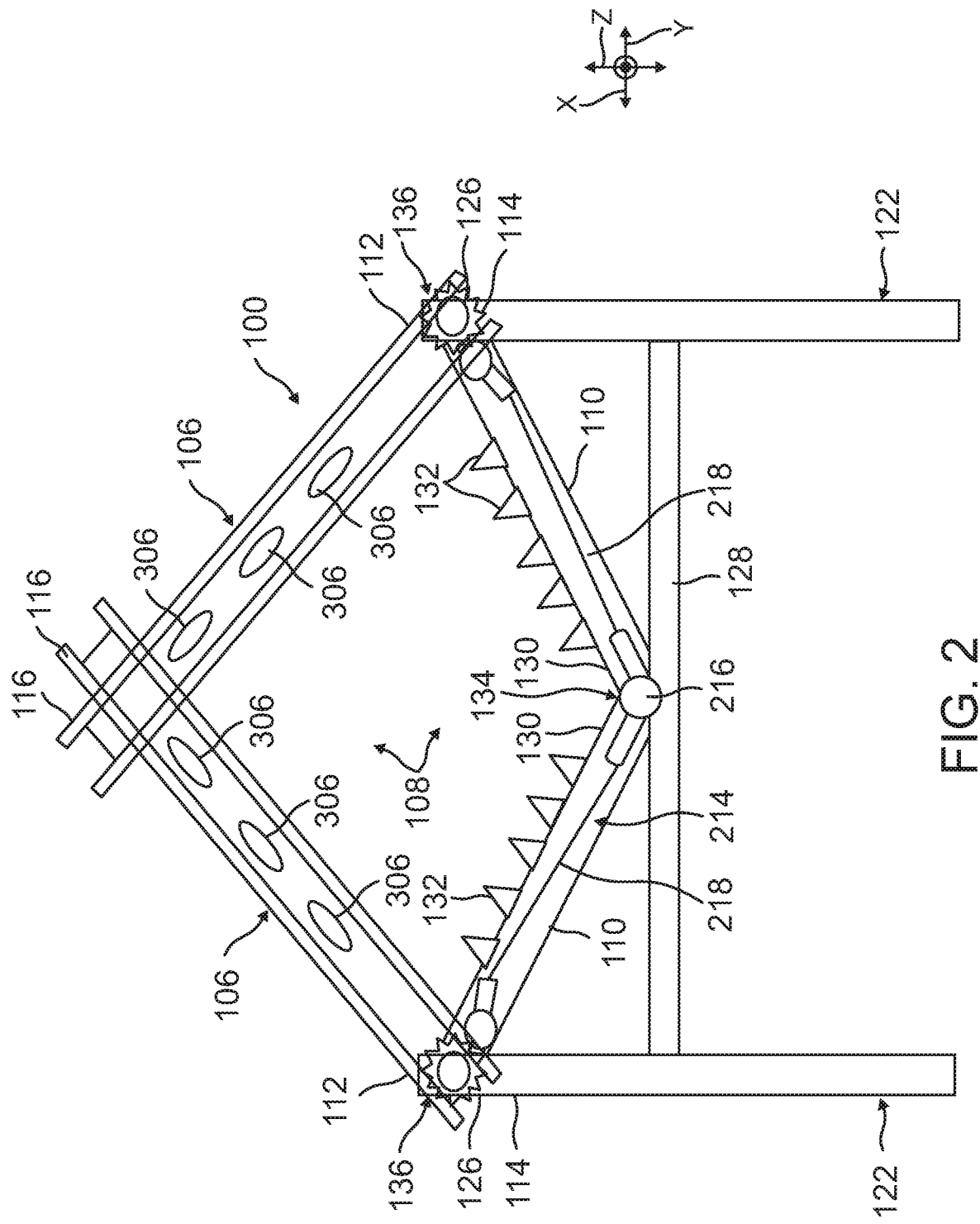
FIG. 2 illustrates a top view of the tree stand shown in FIG. 1.
Figure 3:
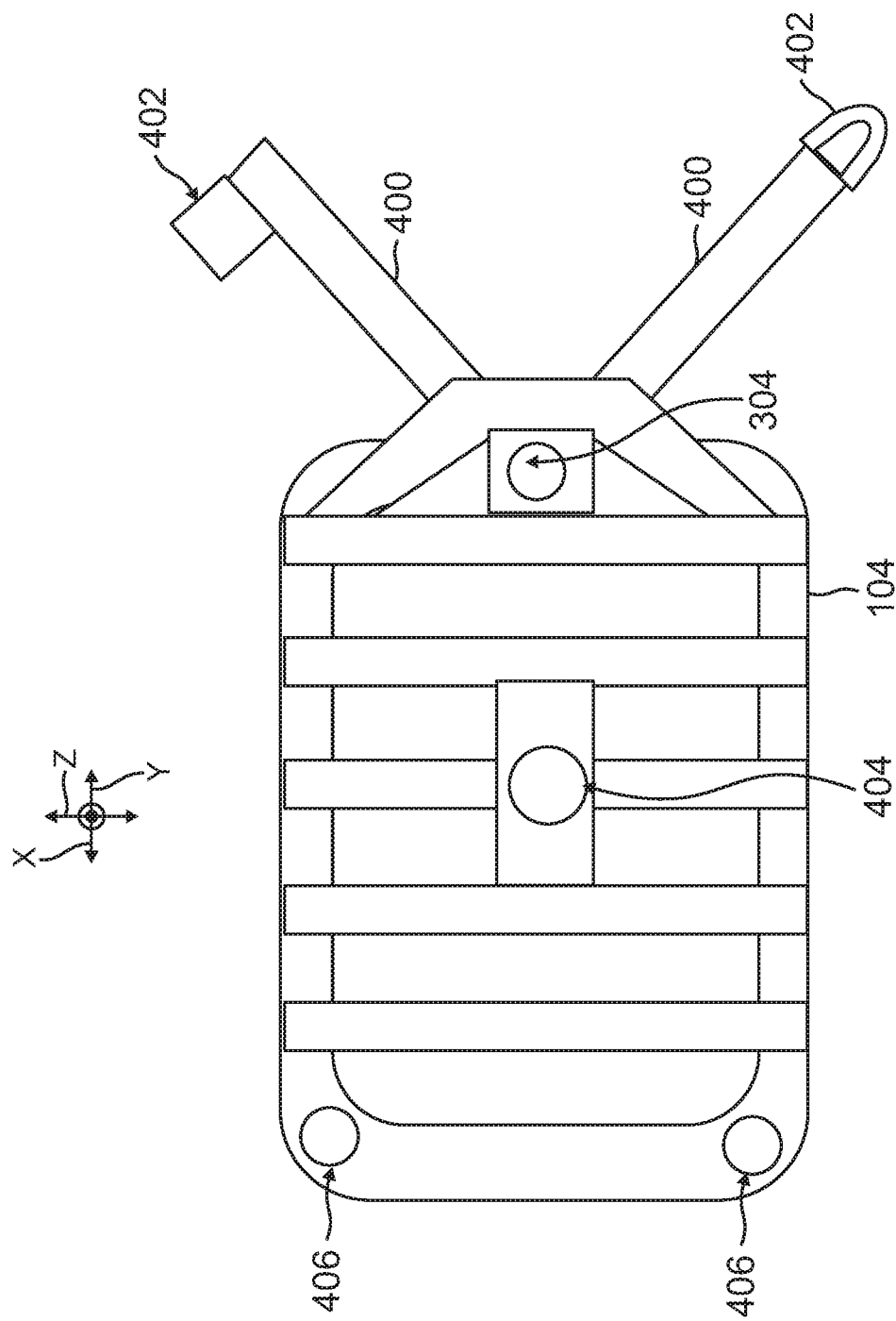
FIG. 3 illustrates a top view of one embodiment of a platform in the tree stand shown in FIG. 1.

Referring now to FIG. 1-FIG. 3, FIG. 1-FIG. 3 illustrates one exemplary embodiment of a tree stand 100 for mounting to a tree trunk 102 of a tree. FIG. 1 illustrates a side vide of the tree stand 100 mounted to the tree trunk 102, FIG. 2 illustrates a top view of the tree stand 100, and FIG. 3 illustrates a top view of a platform 104 of the tree stand 100. When the tree stand 100 is mounted to the tree trunk 102, a hunter (not explicitly shown) can stand on the tree stand 100 in order to obtain an elevated view of an area the hunter is hunting. In this disclosure, the directions are defined based on the orientation of tree stand and components of the tree stand when the tree stand 100 is mounted to the tree trunk 102. More specifically, the z-axis is the vertical axis that defines the up direction and the down direction when tree stand 100 is mounted to the tree trunk 102. The y-axis is orthogonal to the z-axis and is thus one of the horizontal axes. The y-axis refers to the general direction that the platform 104 extends from the tree trunk 102 and may be used to define a forward and a backward direction. The x-axis is also a horizontal axes that is orthogonal to both the x-axis and the z-axis. As such, the x-axis can be used to define both a left direction and a right direction.

The tree stand 100 includes a pair of oppositely disposed arms 106 (utilizing the reference axes defined above, a left arm and a right arm). The pair of oppositely disposed arms 106 are configured to grip the tree trunk 102 in a closed position and are separable to release the tree trunk 102 in an open position. In this embodiment, the tree stand 100 forms an openable enclosure 108. The openable enclosure 108 includes fixed oppositely disposed back members 110 that engage the back of the tree trunk 102. In this specific embodiment, these back members 110 form the back of the enclosure 108, which is fixed in position. Each of the oppositely disposed arms 106 are movably connected to a different one of the back members 110.

In this example, the oppositely disposed arms 106 are I-beams or other structural pieces such as tubing and have a back end 112 connected to a front end 114 of a different one of the back members 110. In the closed position, the arms 106 swing together so that their front ends 116 are swung towards one another and the enclosure 108 is closed. In the open position, the front ends 116 of the arms 106 are swung away from one another so that the enclosure 108 is open. In the open position, the tree trunk 102 can either placed within or removed from the enclosure 108. On the other hand, in the closed position, the enclosure 108 is closed and the arms 106 grip the tree trunk 102 thereby securing the tree stand 100 to the tree trunk 102.

The platform 104 is connected to the pair of oppositely disposed arms 106 so that the platform 104 is mountable to the tree trunk 102 when the pair of oppositely disposed arms 106 grip the tree trunk 102 in the closed position. In this embodiment, the enclosure 108 is connected to the platform 104 through vertical support members 118, 120 and horizontal support members 122. As shown, the platform 104 in this embodiment is vertically displaced from the enclosure 108 wherein the platform 104 is positioned below the enclosure 108. Furthermore, the enclosure 108 is positioned to grip the tree trunk 102.

With regard to the platform 104, the platform 104 is oriented to extend along the y axis behind the tree trunk 102. Thus, the vertical support member 118 extends directly upwards (90 degrees) from the center front of the platform 104 in order to connect to the back of the enclosure 108. The vertical support members 120 are attached near or at the back of the platform 104 and extend diagonally to connect to the back end 124 of the horizontal support members 122. The horizontal support members 122 extend horizontally so that the front end 126 of the horizontal support members 122 are connected at the intersection between back end 112 of the arms 106 and the front end 114 of the back members 110.

In this embodiment, a cross bar 128 is provided that is connected between the horizontal support members 122. As shown, the back ends 130 of the back members 110 are connected in order to close the back of the enclosure 108. The back ends 130 are also connected to the cross bar 128 so that the cross bar 128 adds additional support to the enclosure 108. Thus, the support members 118, 120, 122 and the cross bar 128 allow for the platform 104 to be both horizontally and vertically displaced from the enclosure 108. Teeth 132 (not all labeled for the sake of clarity) are provided along the inside of the back members 110 to help grip the tree trunk 102. This allows for the enclosure 108 to better grip the tree trunk 102 when the tree stand 100 is mounted on the tree trunk 102. In some embodiments, a seat (not explicitly shown) may be placed on the horizontal support members 122 so that a hunter can sit down while on the tree stand 100.

To operate the opening and the closing of the enclosure 108, the tree stand 100 includes an arm operating mechanism 134 that is configured to provide the pair of oppositely disposed arms 106 in the open position and the closed position. Many different types of arm operating mechanisms may be provided some of which are specifically described in this disclosure. However, in this specific example, the arm operating mechanism 134 includes a ratchet gear and pawl mechanism 136 at the back end 126 of each of the arms 106. The arm operating mechanism 134 further includes a torsion spring (See FIG. 4 below) at each of the ratchet gear and pawl mechanisms 136. Each torsion spring is configured to bias its respective arm 106 in the closed position. The ratchet gear and pawl mechanism 136 may be unlocked or locked when the arms 106 are in the closed position. This thus provides a tree stand operating mechanism that increases the safety of the tree stand 100 and makes the tree stand 100 much easier to mount.

However, each of the ratchet gear and pawl mechanism 136 are also configured to provide its respective arm 106 in the open position. The ratchet gear and pawl mechanisms 136 would be operated to oppose the bias of the torsion springs thereby allowing arms 106 to be provided in the open position. When the arms 106 are in the open position, the ratchet gear and pawl mechanisms 136 are configured to lock the pair of oppositely disposed arms 106 in the open position. Once the arms 106 are in the open position, the tree trunk 102 can be either removed or inserted into the enclosure 108. In order to provide the arms 106 in the closed position, the ratchet gear and pawl mechanism 136 are unlocked so that the bias in the torsion springs cause the arms 106 to snap into the closed position as a result of the tension of the torsion springs.

Referring now to FIG. 1 and FIG. 4, FIG. 4 illustrates one embodiment of a ratchet gear and pawl mechanism 136 and torsion spring 200. The ratchet gear and pawl mechanism 136 includes a ratchet gear 202, a pawl 204, and operating members 206, 208. The operating members 206, 208 are connected at approximately 90 degrees from each other. The operating member 206 is connected to the center of the ratchet gear 202 and has a length that is greater than the radius of the ratchet gear 202 so that the operating member 206 sticks out and is accessible for operating the ratchet gear and pawl mechanism 136. The operating member 208 is connected between the operating member 206 and the pawl 204.

When there is no tension on the torsion spring 200, the arms 210, 212 of the torsion spring 200 are proved at approximately a 90 degree angle. One of the arms 106 of the enclosure 108 would be connected to the arm 212 so that the arm 212 is biased in the closed position. The ratchet gear 202 engages the ratchet gear 202 so that twisting the ratchet gear 202 (in this case in the clockwise direction but could also be in the counter clockwise direction depending on the orientation of the torsion spring 200) moves the arm 212 of the torsion spring 200 so that the arms 210, 212 are pulled apart away from one another, which thereby moves the arm 106 of the enclosure 108 into the open position. This increases the tension of the torsion spring 200, which is biased so that the arm 106 is provided in the closed position.

However, when the arm 106 is in the open position and the torsion spring 200 has the arms 210, 212 approximately 180 degrees apart, the pawl 204 is provided between a pair of teeth in the ratchet gear 202, which thereby locks the torsion spring 200 so that the arm 106 is locked in the open position and the torsion spring 200 has the arms 210, 212 approximately 180 degrees apart. However, utilizing a crank mechanism 214 (explained in further detail below—See FIG. 1), the ratchet gear and pawl mechanism 136 can be unlocked by moving the operating member 206 counterclockwise, which thereby causes the operating member 208 to remove the pawl 204 from between the teeth of the ratchet gear 202. As a result, this removes the tension in the torsion spring 200 and the arms 210, 212 move into to approximately 90 degrees. Consequently, the arm 106 of the enclosure 108 is moved into the closed position.

The crank mechanism 214 is operably associated with both of the ratchet gear and pawl mechanisms 136 such that twisting the crank mechanism 214 in opposite directions causes the ratchet gear and pawl mechanisms 136 to set the arms 106 of the enclosure 108 in the open position and the closed position. One example of the crank mechanism 214 is shown in FIG. 2. The crank mechanism 214 has got a central wheel 216 and connection members 218 that connect to the central wheel 216 in order to operate the ratchet gear and pawl mechanisms 136 for both of the arms 106. It should be noted that the ratchet gear and pawl mechanisms 136 and the torsions springs (not explicitly shown in FIG. 1) may be oppositely oriented on the right side and on the left side. Furthermore, the connection members 218 may be connected on opposite sides of the central wheel 216. In this manner, turning the central wheel 216 in a single direction causes the ratchet gear and pawl mechanisms 136 on both sides to unlock (by moving the operating arm 206 in both ratchet gear and pawl mechanisms 136) and thereby providing both arms 106 in the closed position. To provide the arms 106 in the open position, the central wheel 216 is rotated in the opposite direction thereby causing the ratchet gear and pawl mechanisms 136 to oppose the bias in the torsions springs until the arms 106 are locked in the open position.

Figure 5:
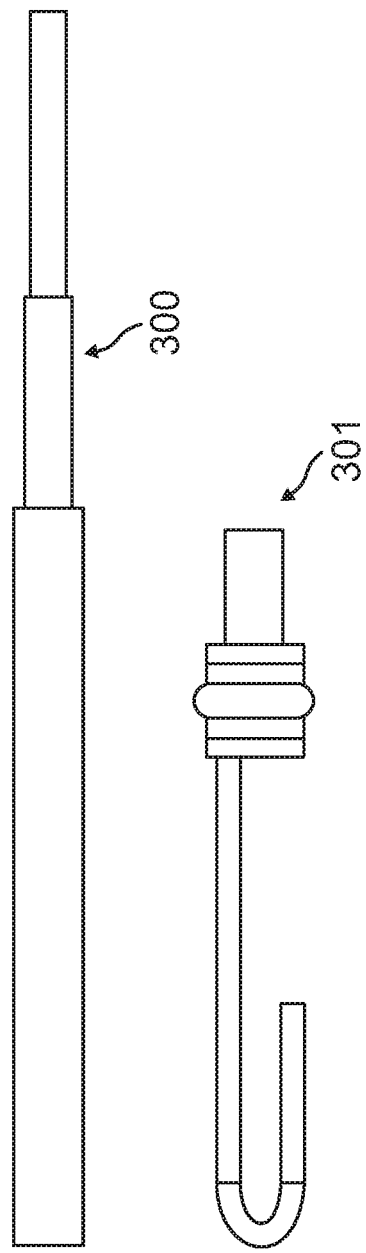
FIG. 5 illustrates one embodiment of a pole and hook that may be utilized to mount and operate the tree stand mounting mechanism shown in FIG. 1.

Referring now to FIG. 1, FIG. 3, and FIG. 5, FIG. 5 illustrates a pole 300 that may be utilized to mount and operate the tree stand 100 along with a hook 301 that may be utilized to provide a fail safe for the tree stand 100 when mounted on the tree trunk 102. The arm operating mechanism 134 defines a pole engagement unit 302 configured to receive the pole 300 such that twisting the pole 300 operates the arm operating mechanism 134. For example, the pole engagement unit 302 allows the pole 300 to engage the central wheel 216 in the crank mechanism 214. As shown, the platform 104 includes a funneled aperture 304 wherein the funneled aperture 304 is directly horizontally aligned with the pole engagement unit 302. In this manner, the pole 300 can be placed through the funneled aperture 304 and into the pole engagement unit 302. The funneling of the funneled aperture 304 helps the hunter insert the pole 300 even in poorly lit conditions. Using the pole 300, a hunter can then twist the pole 300 in the pole engagement unit 302 until the arms 106 are in the open position.

With the pole 300 provided through the funneled aperture 304 and into the pole engagement unit 302, the hunter can then take the pole 300 and position the tree stand 100 using the pole 300 so that the tree trunk 102 is provided in the enclosure 108 while the arms 106 are in the open position. Once the tree trunk 102 is in the enclosure 108, the hunter can then twist the pole 300 so that the ratchet gear and pawl mechanisms 136 unlock thereby causing the torsion springs to provide the arms 106 of the enclosure 108 in the locked position. The pole 300 can then be removed from the pole engagement unit 302 and the funneled aperture 304. As shown, each of the arms 106 defines a set of overlapping slots 306 (See FIG. 2). The pole 300 has a hook 301 to hang into the overlapping slots 306 in the arms 106 that lock onto the tree trunk 102 for an extra fail-safe measure.

Referring now to FIG. 3, a pair of oppositely disposed support member 400 are provided to extend horizontally and diagonally (in the x-y plane) in front of the platform 104. In this manner, the support members 400 are designed to abut the tree trunk 102 when the tree stand 100 is mounted on the tree. Furthermore, each of the support members 400 define tying apertures 402. The tying apertures 402 allows for a cord (e.g., rope, band, etc.) to tie the support members 400 around the tree trunk 102 so that the platform 104 stay firmly against the tree trunk 102. The platform 104 also defines a seat engagement aperture 404 that is configured to receive the pole of a spin seat or other seat option (not expressly shown). In this manner, a spin seat can be provided with the platform 104 serving as the base of the spin seat.

Furthermore, as shown in FIG. 3, the back end of the platform 104 further defines a pair of oppositely disposed cable/rope ladder attachment apertures 406 (left and right cable/rope ladder attachment apertures). The top of the cable/rope ladder (not explicitly shown) can be attached to the cable/rope ladder attachment apertures 406. In this manner, the cable/rope ladder can be used by the hunter to climb into the tree stand 100.

However, one of the problems with cable/rope ladders is that they are difficult to climb. More specifically, cable/rope ladders have cable or ropes as rails and these rails are thus very flexible. This can make these cable/rope ladders difficult to climb and significantly increase the risk of injury. The best way to stabilize the cable/rope ladders is to secure the bottom of the cable/rope ladder and maintaining the cable/rope ladder taught.

Figure 6:
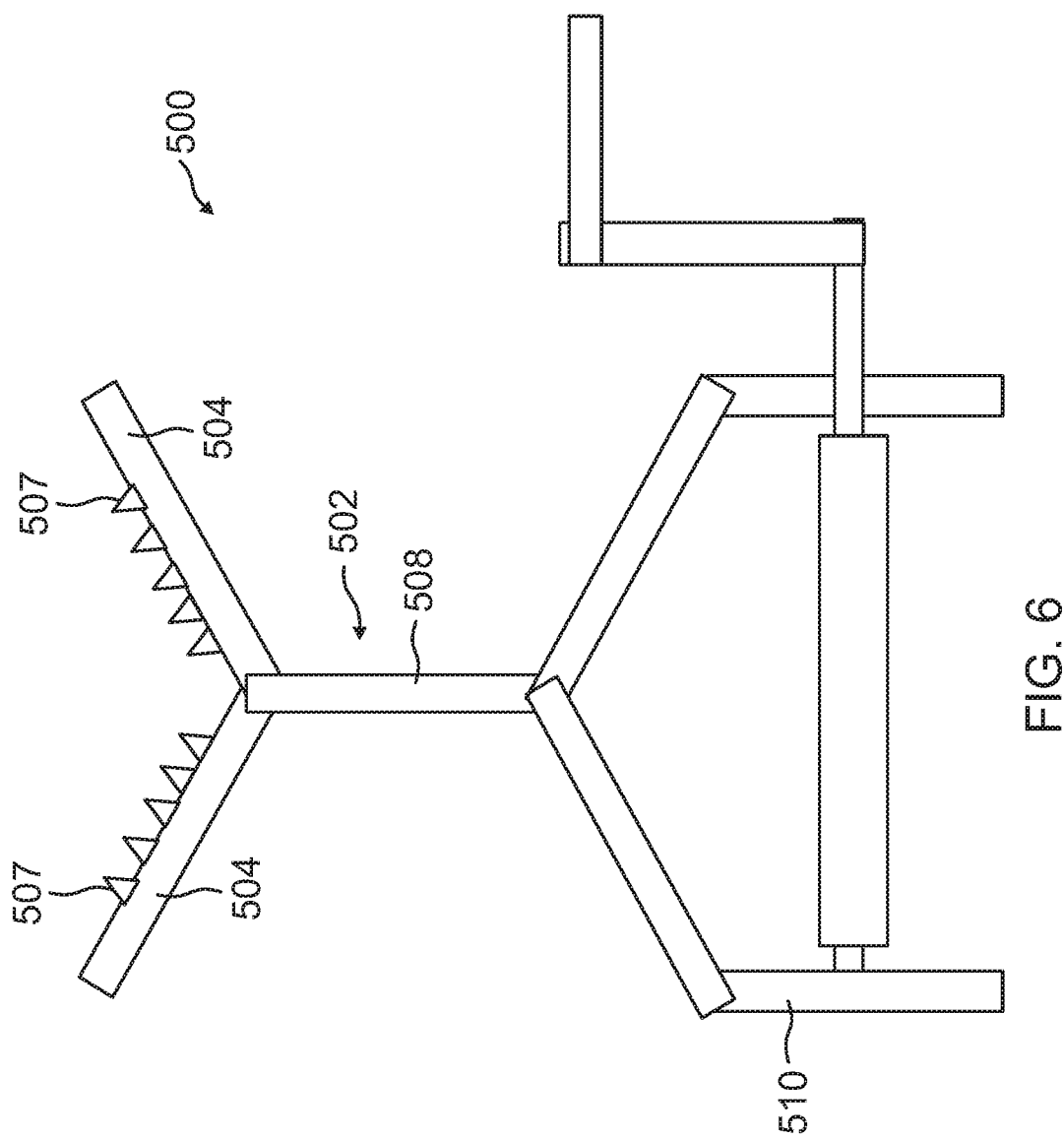
FIG. 6 illustrates a top view one embodiment of a lower ladder spool that may be utilized to maintain a cable/rope ladder taught in order to climb the tree stand shown in FIG. 1.
Figure 7:
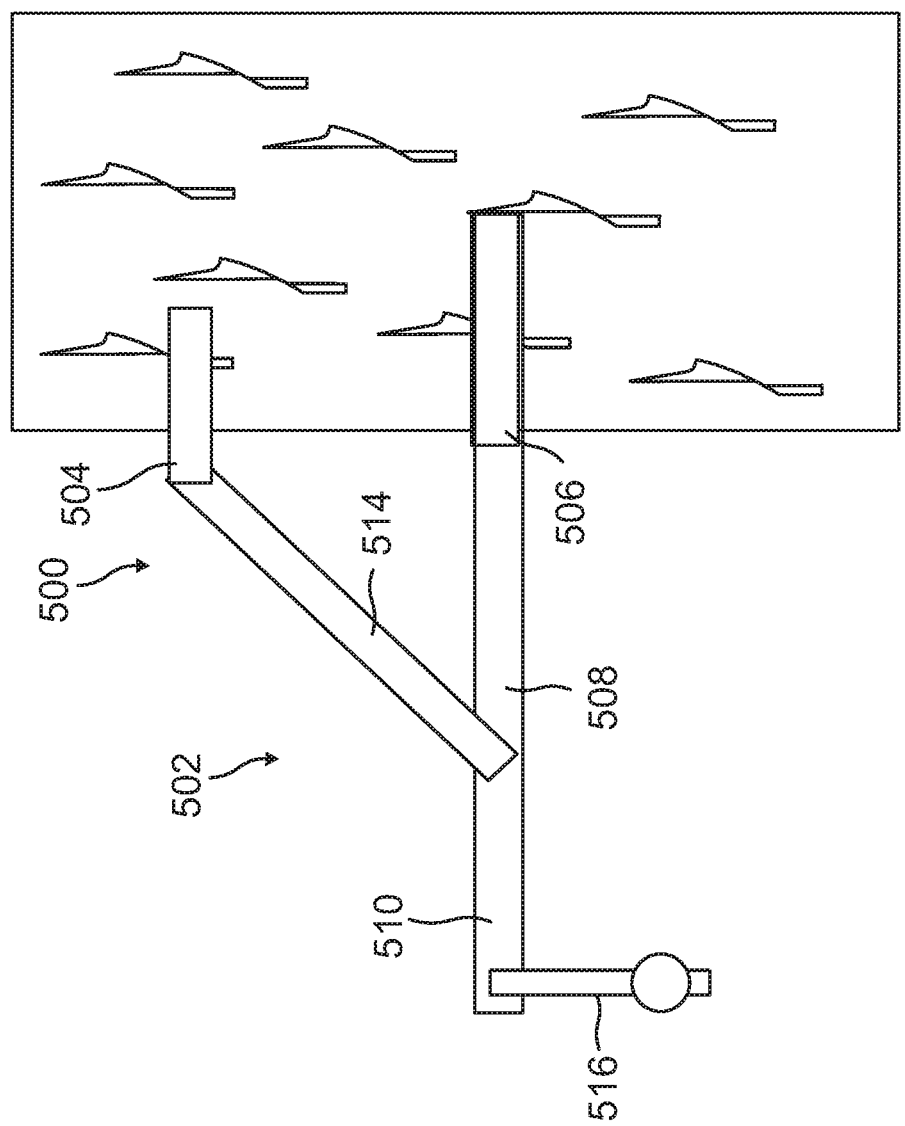
FIG. 7 illustrates a side view of the lower ladder spool shown in FIG. 6.

Referring now to FIG. 3, FIG. 6 and FIG. 7, FIG. 6 illustrates a top view of one embodiment of a lower ladder spool 500 while FIG. 7 illustrates a side view of the lower ladder spool 500. The lower ladder spool 500 includes a mounting frame 502. The mounting frame 502 includes top mounting members 504 and bottom mounting members 506 on the bottom with mounting teeth 507 (not all labeled for the sake of clarity) for mounting the mounting frame 502 to the tree trunk. The bottom mounting members 506 are attached to a horizontal support member 508. The horizontal support member 508 is attached a spool frame 510. A spool 512 is mounted to the spool frame 510. A vertical support member 514 is attached to the horizontal support member 508 in order to attach the top mounting members 504 to the spool frame 510.

A crank 516 is attached to the spool frame 510 in order to turn the spool 512. The lower ladder spool 500 can be mounted below the platform 104. The bottom of the cable rope ladder can then be spun into the spool 512 and the crank 516 can be spun so that the cable rope ladder is taught. As such, it becomes much easier for a hunter to use the cable rope ladder to climb onto the platform 104 when the tree stand 100 is mounted to the tree trunk 102.

Figure 8:
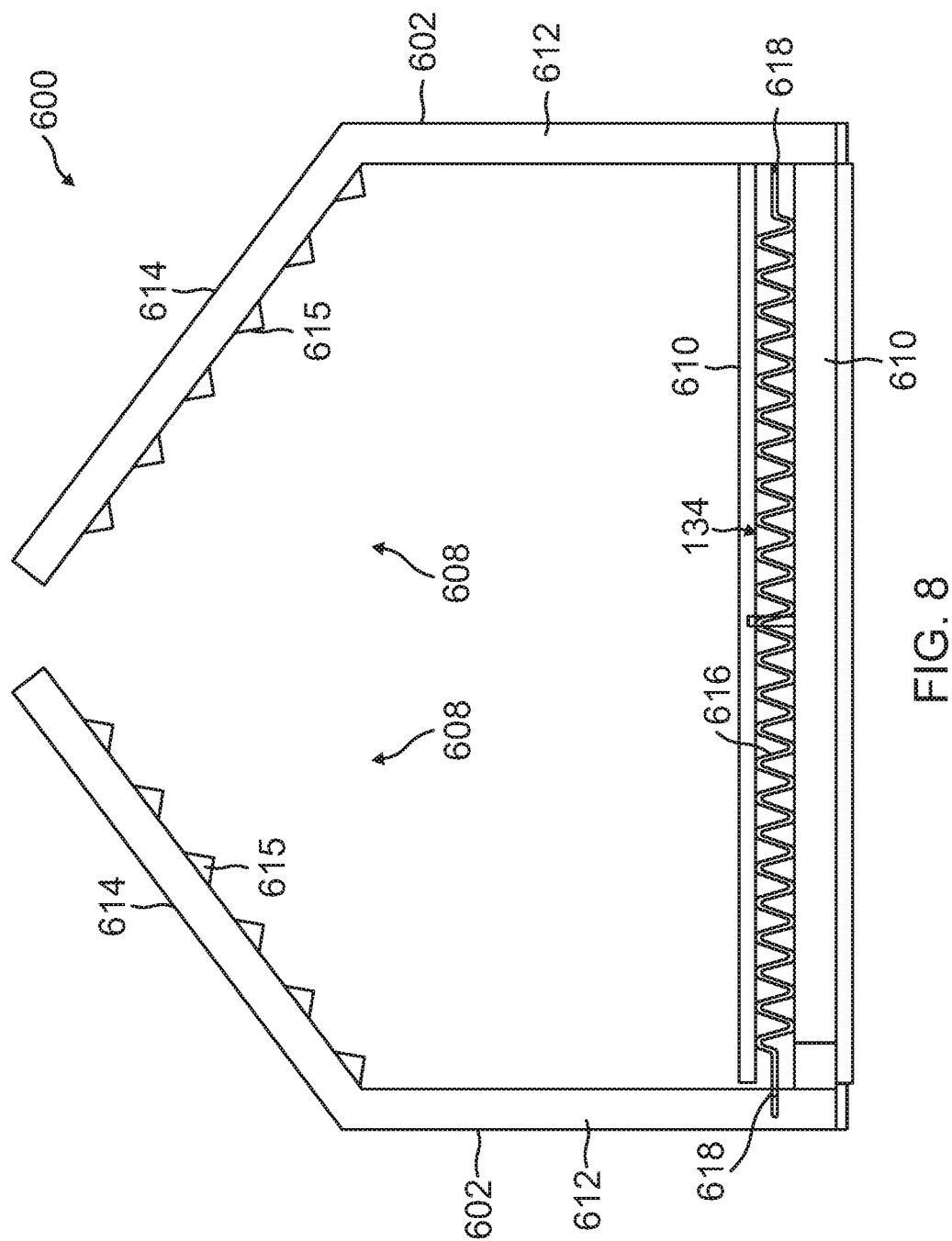
FIG. 8 illustrates a top view of another embodiment of a tree stand mounting mechanism that may be utilized to mount a tree stand.
Figure 9:
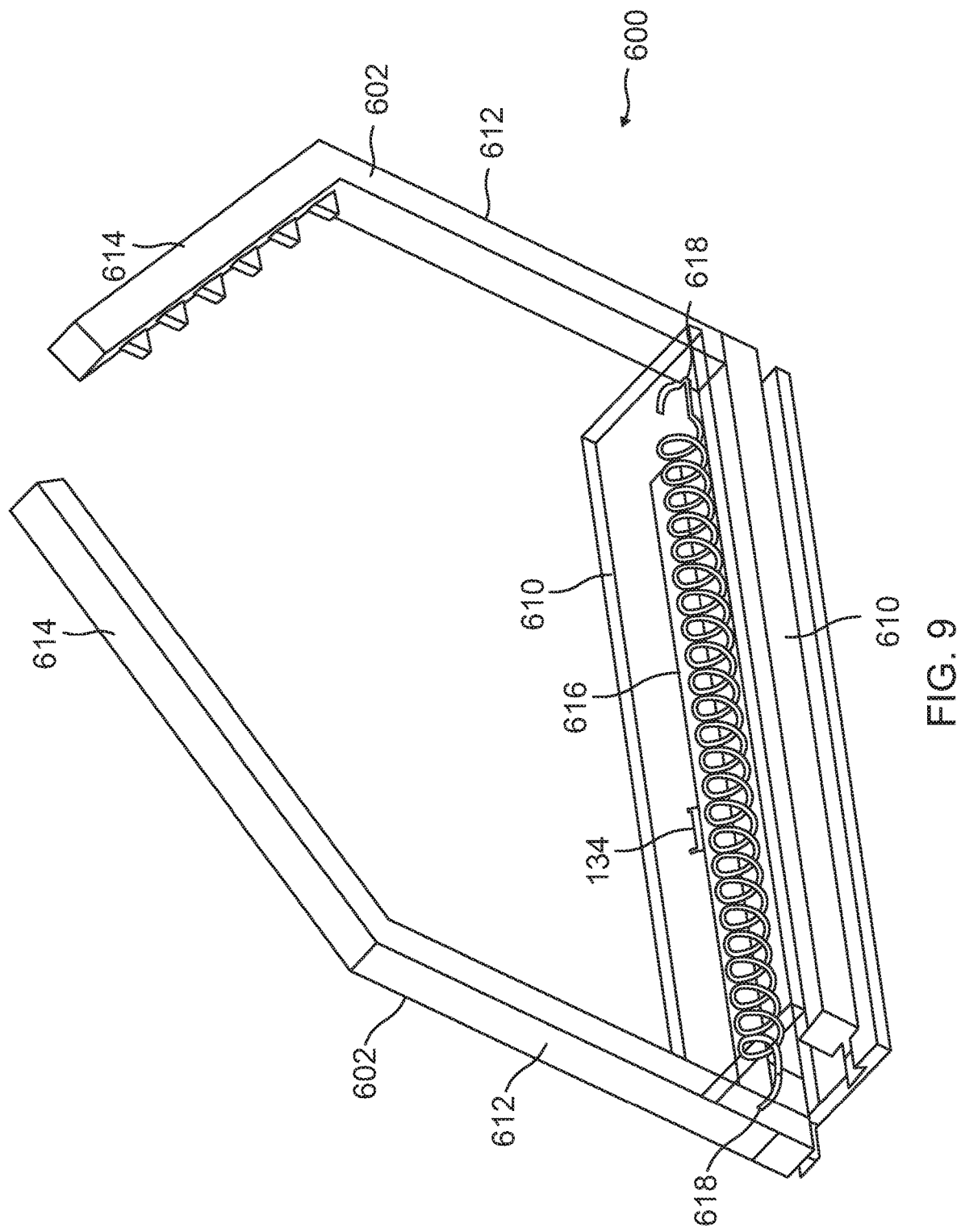
FIG. 9 illustrates a perspective view of the tree stand mounting mechanism shown in FIG. 8.
Figure 10:
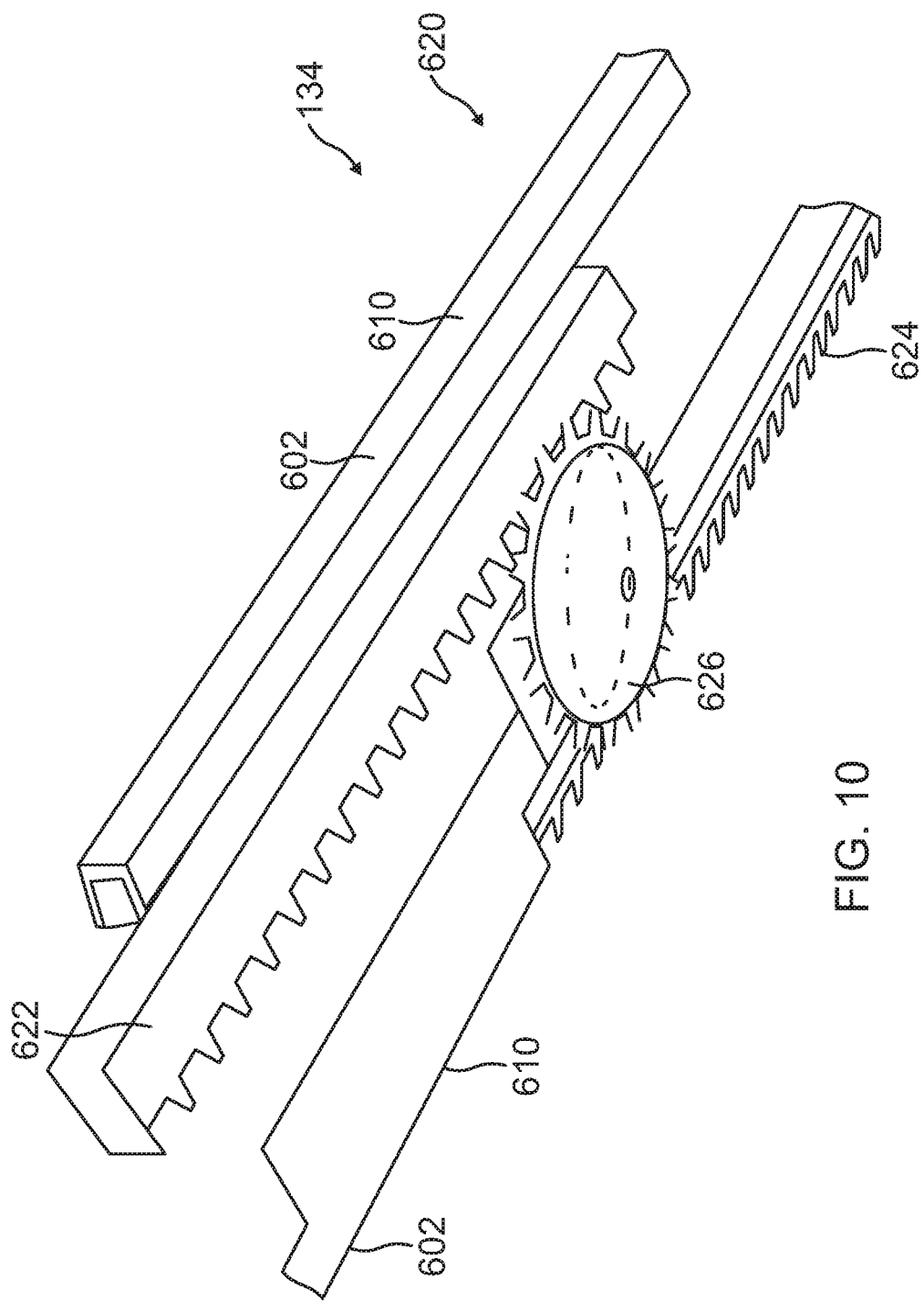
FIG. 10 illustrates one embodiment of a rack and pinion mechanism that may be utilized to operate the tree stand mounting mechanism shown in FIG. 8.

Referring now to FIG. 8-FIG. 10, FIG. 8-FIG. 10 illustrates another exemplary embodiment of a tree stand mounting mechanism 600 for mounting the tree stand 100 to the tree trunk 102 of a tree. FIG. 8 illustrates a top view of the tree stand mounting mechanism 600, FIG. 9 illustrates a perspective view of the tree stand mounting mechanism 600, and FIG. 10 illustrates another embodiment of the arm operating mechanism 134 of the tree stand mounting mechanism 600. The tree stand mounting mechanism 600 includes a pair of oppositely disposed arms 602 (utilizing the reference axes defined above, a left arm and a right arm). The pair of oppositely disposed arms 602 are configured to grip the tree trunk 102 in a closed position and are separable to release the tree trunk 102 in an open position. In this embodiment, the tree stand mounting mechanism 600 forms an openable enclosure 608. Each of the arms 602 includes a slidable back member 610, a horizontal member 612 that is attached to the slidable back member 610, and diagonally disposed front members 614 that are attached to the horizontal members 612. The tree stand mounting mechanism 600 may be utilized on the tree stand 100 by replacing the enclosure 108 with the enclosure 608 and utilizing the arm operating mechanism 134 shown in FIG. 10 instead of the arm operating mechanism 134 shown in FIG. 2 and FIG. 4.

By sliding the arms 602 away from one another, the arms 602 separate to the left and to the right and the enclosure 608 is provided in the open position. By sliding the arms 602 towards one another, the enclosure 608 is provided in the closed position. In the open position, the tree trunk 102 can either placed within or removed from the enclosure 608. On the other hand, in the closed position, the enclosure 608 is closed and the arms 602 grip the tree trunk 102 thereby securing the tree stand mounting mechanism 600 to the tree trunk 102. Teeth 615 (not all explicitly labeled for the sake of clarity) are provided along the inside of the front members 614 to help grip the tree trunk 102.

The arm operating mechanism 134 utilized in this embodiment is shown in FIG. 10. A spring 616 (See FIG. 8 and FIG. 9) is configured to bias the pair of oppositely disposed arms 602. In this embodiment, opposite ends 618 of the spring 616 are attached to the horizontal members 612 of a different one of the arms 616. This causes the spring 616 to bias the arms 602 towards one another so that the arms 602 are biased in the closed position.

A rack and pinion mechanism 620 is operably associated with the arms 602 and configured to be turned to oppose the bias of the spring 616 so that the pair of oppositely disposed arms 602 are operable to be provided in the open position. The rack and pinion mechanism 620 has a rack 622, a rack 624, and a pinion gear 626. The rack 622 is connected to the back member 610 of the left one of the arms 602 while the rack 624 is connected to the back member 610 of the right one of the arms 602. The pinion gear 626 that engages both of the racks 622, 624 so that turning the pinion gear 626 counterclockwise cause the arms 602 to separate and provide the arms 602 in the open position. By releasing the pinion gear 626, the spring 616 pushes both racks 622, 624 so that the pair of oppositely disposed arms 602 are biased in the closed position. Thus, by turning the pinion gear 626, the arm operating mechanism 134 can be operated to open and close the enclosure 608.

Figure 11:
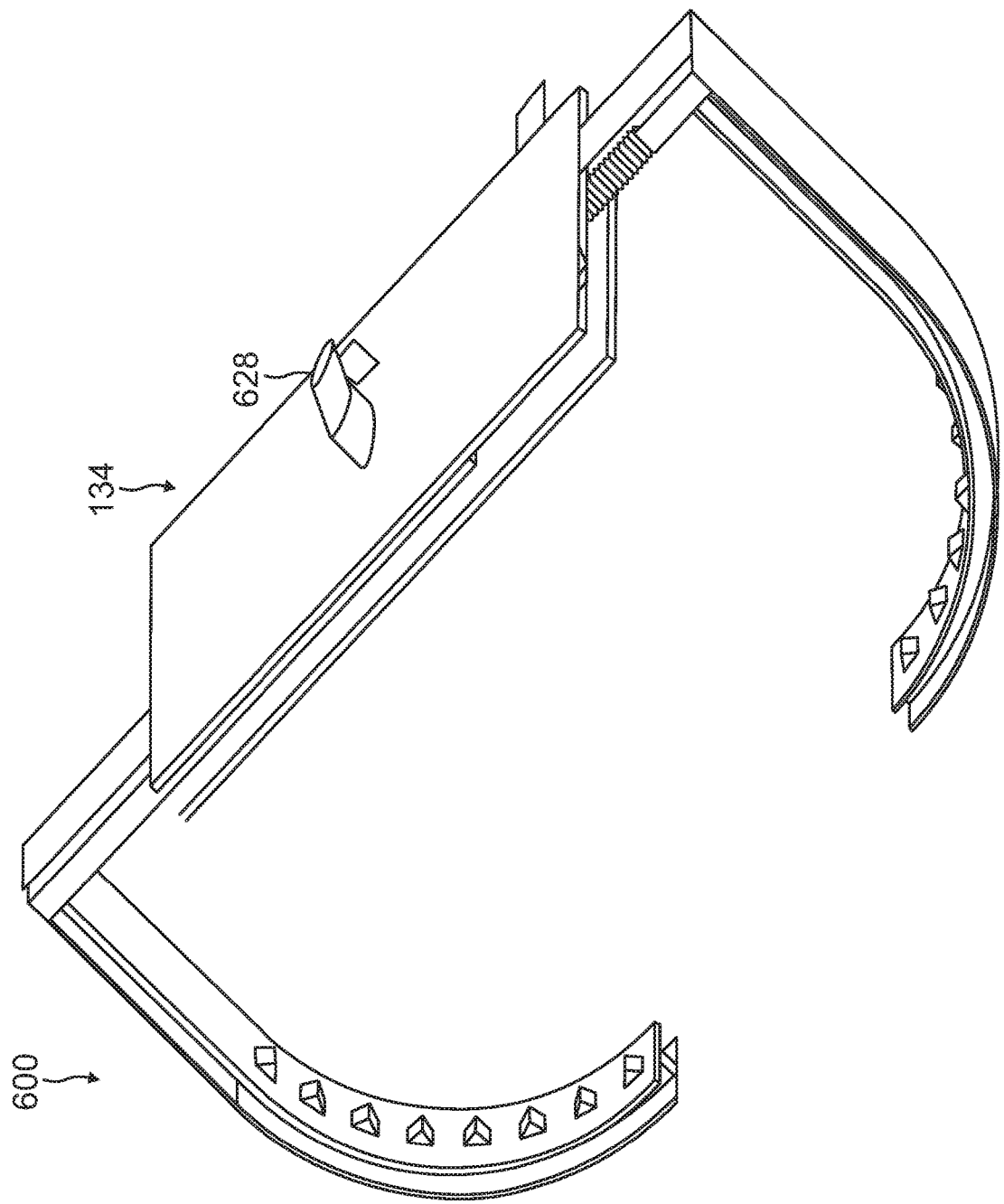

FIG. 11 illustrates a back view of the tree stand mounting mechanism 600 shown in FIG. 9 and FIG. 10. As shown in FIG. 11, the arm operating mechanism 134 may include a pole engagement unit 628. The pole engagement unit 628 is configured to receive a pole (e.g., the pole 300 shown in FIG. 5) such that twisting the pole operates the arm operating mechanism 134.

Figure 12:
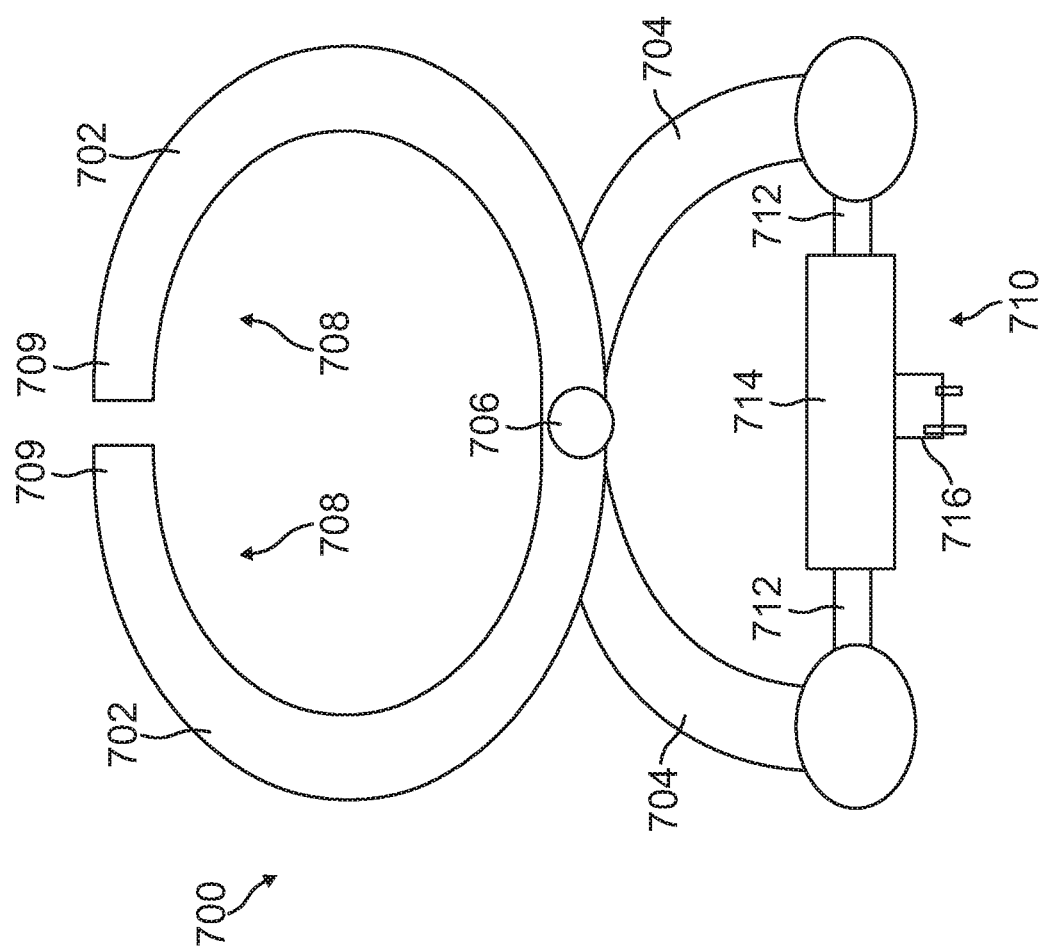
FIG. 12 illustrates yet another embodiment of a tree stand mounting mechanism that utilizes a hydraulic device to mount and unmount the stand from the tree utilizing the extendable pole.

Referring now to FIG. 12, FIG. 12 illustrates another exemplary embodiment of a tree stand mounting mechanism 700 for mounting the tree stand 100 to the tree trunk 102 of a tree. The tree stand mounting mechanism 700 includes a pair of oppositely disposed arms 702 (utilizing the reference axes defined above, a left arm and a right arm). The pair of oppositely disposed arms 702 are configured to grip the tree trunk 102 in a closed position and are separable to release the tree trunk 102 in an open position. Each of the arms 702 in this embodiment is arcuate in shape and is connected to a different one of oppositely disposed handles 704. The handles 704 and the arms 702 pivot about a joint 706 so that the arms 702 form an openable enclosure 708. The tree stand mounting mechanism 700 may be utilized on the tree stand 100 by replacing the enclosure 108 with the enclosure 708 and utilizing the arm operating mechanism 134 shown in FIG. 12 instead of the arm operating mechanism 134 shown in FIG. 2 and FIG. 4.

When the handles 704 are swung towards one another, the ends 709 of the arms 702 move away from one another and the angle between the arms 704 increases. In this manner, the enclosure 708 is provided in the open position. On the other hand, when the handles 704 are swung away from one another, the ends 709 of the arms 702 move towards one another and the angle between the arms 702 decreases. In this manner, the enclosure 708 is provided in the closed position. In the open position, the tree trunk 102 can either placed within or removed from the enclosure 708. On the other hand, in the closed position, the enclosure 708 is closed and the arms 702 grip the tree trunk 102 thereby securing the tree stand mounting mechanism 700 to the tree trunk 102.

In this embodiment, the arm operating mechanism 134 is provided as a hydraulic device 710. The hydraulic device 710 is configured to provide the pair of oppositely disposed arms 702 in the open position and in the closed position. More specifically, the hydraulic device 710 is operably associated with the handles 710 so as to be able to separate or join the handles 710. The hydraulic device 710 has oppositely disposed hydraulic rams 712 that each engage a different one of the handles 704. The rams 712 are configured to emerge from the hydraulic chamber 714 horizontally as a result of operating the hydraulic device 710. Similarly, the rams 712 are configured to retreat into the hydraulic chamber 714 by operating the hydraulic device 710. In this manner, the enclosure 708 can be provided in the open position and in the closed position.

The hydraulic device 710 includes a pole engagement unit 716 for receiving a pole (e.g., the pole 300). The pole engagement unit 716 is configured such that twisting the pole in a first rotational direction in the pole engagement unit causes the hydraulic device 710 to provide the pair of oppositely disposed arms in the closed position and such that twisting the pole in the second rotational direction in the pole engagement unit 716 causes the hydraulic device 710 to provide the pair of oppositely disposed arms 702 in the closed position. Thus, a pole can be used to operate the enclosure 708.

Referring now to FIG. 13, FIG. 13 illustrates another exemplary embodiment of a tree stand mounting mechanism 800 for mounting the tree stand 100 to the tree trunk 102 of a tree. The tree stand mounting mechanism 800 includes a pair of oppositely disposed arms 802 (utilizing the reference axes defined above, a left arm and a right arm). The pair of oppositely disposed arms 802 are configured to grip the tree trunk 102 in a closed position and are separable to release the tree trunk 102 in an open position. Each of the arms 802 in this embodiment is accurate in shape and is connected to a different one of oppositely disposed handles 804. The handles 804 and the arms 802 pivot about a joint 806 so that the arms 802 form an openable enclosure 808. The tree stand mounting mechanism 800 may be utilized on the tree stand 100 by replacing the enclosure 108 with the enclosure 808 and utilizing the arm operating mechanism 134 shown in FIG. 13 instead of the arm operating mechanism 134 shown in FIG. 2 and FIG. 4.

When the handles 804 are swung towards one another, the ends 808 of the arms 802 move away from one another and the angle between the arms 804 increases. In this manner, the enclosure 808 is provided in the open position. On the other hand, when the handles 704 are swung away from one another, the ends 809 of the arms 802 move towards one another and the angle between the arms 802 decreases. In this manner, the enclosure 808 is provided in the closed position. In the open position, the tree trunk 102 can either placed within or removed from the enclosure 808. On the other hand, in the closed position, the enclosure 808 is closed and the arms 802 grip the tree trunk 102 thereby securing the tree stand mounting mechanism 800 to the tree trunk 102.

In this embodiment, the arm operating mechanism 134 is provided as a beveled gear system 810. The beveled gear system 810 has a bolt with opposing threads, as explained in further detail below. The beveled gear system 810 is configured to provide the pair of oppositely disposed arms 802 in the open position and in the closed position. As shown in FIG. 13, the beveled gear system 810 has two pairs of members 812 that are each connected at a different end 814. The pairs of the members 812 are connected to provide at opposing threads 816 at the ends of the handles 804. A bolt 818 is provided through the opposing threads 816. Furthermore, each of the opposing threads 816 is connected to a different one of the handles 804.

By turning the bolt 818 in one rotational direction, the angle of each pair of the members 812 at each end 814 is decreased and the handles 804 are moved toward one another. On the other hand, by turning the bolt 818 in the opposite rotational direction, the angle of each pair of the members 812 at each joint 814 is increased and the handles 804 are moved toward one another. In this manner, the enclosure 808 can be provided in the open position and in the closed position.

The beveled gear system 810 includes a pole engagement unit 820 for receiving a pole (e.g., the pole 300). The pole engagement unit 820 is configured such that twisting the pole in a first rotational direction in the pole engagement unit causes the beveled gear system 810 to provide the pair of oppositely disposed arms in the closed position and such that twisting the pole in the second rotational direction in the pole engagement unit 820 causes the beveled gear system 810 to provide the pair of oppositely disposed arms 802 in the closed position. Thus, a pole can be used to operate the enclosure 808.

Those skilled in the art will recognize improvements and modification to the preferred embodiments of the present disclosure. All such improvements and modifications are considered within the scope of the concepts disclosed herein and the claims that follow.

What is claimed is:

1. A tree stand for mounting to a tree trunk, comprising:
   a pair of oppositely disposed arms, wherein the pair of oppositely disposed arms are configured to grip the tree trunk in a closed position and are separable to release the tree trunk in an open position; and
   a platform connected to the pair of oppositely disposed arms so that the platform is mountable to the tree trunk when the pair of oppositely disposed arms grip the tree trunk in the closed position;
   an arm operating mechanism configured to provide the pair of oppositely disposed arms in the open position and the closed position, the arm operating mechanism comprising a first torsion spring configured to bias a first arm of the pair of oppositely disposed arms in the closed position, and a first ratchet gear and pawl mechanism configured to provide the first arm in the open position, wherein the first ratchet gear and pawl mechanism is configured to lock the first arm in the open position.

2. The tree stand of claim 1, wherein the arm operating mechanism defining a pole engagement unit configured to receive a pole such that twisting the pole operates the arm operating mechanism.

3. The tree stand of claim 1, wherein the arm operating mechanism further comprises a crank mechanism operably associated with the first ratchet gear and pawl mechanism such that twisting the crank mechanism in opposite directions causes the first ratchet gear and pawl mechanism to set the first arm in the open position and the closed position.

4. The tree stand of claim 3, wherein the arm operating mechanism comprises:
   a second torsion spring configured to bias a second arm of the pair of oppositely disposed arms in the closed position; and
   a second ratchet gear and pawl mechanism configured to provide the second arm in the open position, wherein the second ratchet gear and pawl mechanism is configured to lock the second arm in the open position.

5. The tree stand of claim 4, wherein the crank mechanism is operably associated with the second ratchet gear and pawl mechanism such that twisting the crank mechanism in opposite directions causes the second ratchet gear and pawl mechanism to set the second arm in the open position and the closed position.

* * * * *